United States Patent
Ho

(10) Patent No.: US 11,437,685 B2
(45) Date of Patent: Sep. 6, 2022

(54) LITHIUM-ION BATTERY

(71) Applicant: GRST International Limited, Hong Kong (HK)

(72) Inventor: Kam Piu Ho, Hong Kong (HK)

(73) Assignee: GRST International Limited, Hong Kong (HK)

(*) Notice: Subject to any disclaimer, the term of this patent is extended or adjusted under 35 U.S.C. 154(b) by 696 days.

(21) Appl. No.: 16/321,467

(22) PCT Filed: Mar. 27, 2018

(86) PCT No.: PCT/CN2018/080744
§ 371 (c)(1),
(2) Date: Jan. 29, 2019

(87) PCT Pub. No.: WO2019/183816
PCT Pub. Date: Oct. 3, 2019

(65) Prior Publication Data
US 2021/0359376 A1   Nov. 18, 2021

(51) Int. Cl.
| | |
|---|---|
| *H01M 50/449* | (2021.01) |
| *H01M 50/426* | (2021.01) |
| *H01M 50/491* | (2021.01) |
| *H01M 50/446* | (2021.01) |
| *H01M 50/434* | (2021.01) |
| *H01M 10/0525* | (2010.01) |
| *H01M 10/42* | (2006.01) |

(52) U.S. Cl.
CPC ..... *H01M 50/449* (2021.01); *H01M 10/0525* (2013.01); *H01M 10/4235* (2013.01); *H01M 50/426* (2021.01); *H01M 50/434* (2021.01); *H01M 50/446* (2021.01); *H01M 50/491* (2021.01)

(58) Field of Classification Search
CPC .................. Y02E 60/10; Y02P 70/50
See application file for complete search history.

(56) References Cited

U.S. PATENT DOCUMENTS

| | | | |
|---|---|---|---|
| 2009/0042008 A1* | 2/2009 | Kimishima | H01M 50/411 428/221 |
| 2012/0028104 A1* | 2/2012 | Brant | H01M 10/0525 429/145 |
| 2013/0089794 A1 | 4/2013 | Kim | |
| 2013/0149560 A1* | 6/2013 | Viavattine | H01M 4/0407 429/7 |
| 2013/0224552 A1* | 8/2013 | Hong | H01M 50/426 429/144 |
| 2015/0064511 A1* | 3/2015 | Wang | H01M 10/647 429/50 |
| 2017/0346063 A1 | 11/2017 | Wong et al. | |
| 2019/0237732 A1* | 8/2019 | Hu | H01M 50/461 |

FOREIGN PATENT DOCUMENTS

| | | |
|---|---|---|
| CN | 105552277 A | 5/2016 |
| CN | 107799696 A | 3/2018 |
| WO | WO 2006/123811 | * 11/2006 |

OTHER PUBLICATIONS

Machine translation of WO 2006/123811, published on Nov. 23, 2006 (Year: 2006).*
Polyethylene (PE), APC Packaging, available at https://techcenter.apcpackaging.com/lets-talk-pe, date unknown.*
International Search Report of PCT Patent Application No. PCT/CN2018/080744 dated Jan. 4, 2019.

* cited by examiner

*Primary Examiner* — Anca Eoff

(57) ABSTRACT

Provided herein is a lithium-ion battery comprising an electrode assembly, wherein the electrode assembly comprises at least one cathode, at least one anode, and a separator interposed between the at least one cathode and the at least one anode; and wherein the separator comprises a porous base material and a porous polymer layer coated on a surface of the porous base material and adjacent to the at least one cathode. The lithium-ion battery comprising the separator disclosed herein prevents thermal runaway during overcharge, thereby ensuring the safety of lithium-ion battery.

19 Claims, 2 Drawing Sheets

LITHIUM-ION BATTERY

CROSS-REFERENCE TO RELATED APPLICATIONS

This is a U.S. national stage application, filed under 35 U.S.C. § 371, of the International Patent Application No. PCT/CN2018/080744, filed Mar. 27, 2018, which is incorporated herein by reference in its entirety.

FIELD OF THE INVENTION

The present invention relates to the field of batteries. In particular, this invention relates to a lithium-ion battery.

BACKGROUND OF THE INVENTION

In the past decades, lithium-ion batteries (LIBs) have been widely utilized in various applications especially consumer electronics because of their superior energy density, long cycle life and discharging capability. Due to rapid market development of electric vehicles (EV) and grid energy storage, high-performance, low-cost LIBs are currently offering one of the most promising options for large-scale energy storage devices.

Currently, a lithium-ion battery comprises a cathode, an anode, a separator interposed between the cathode and anode, and an electrolyte solution. Conventional separators such as porous polyethylene and polypropylene are used to manufacture lithium-ion batteries. At elevated temperature, the pores of porous polyethylene separator close to stop the transport of lithium ions. However, when the temperature of the battery is close to or above the melting of the porous polyethylene separator, the porous polyethylene separator will shrink and melt, thus leading to short-circuit and thermal runaway.

CN Patent Application Publication No. CN105552277A discloses a separator for lithium-ion batteries comprising a base material and a PVDF-coating coated on one or both surfaces of the base material, wherein the thickness of the PVDF-coating is from 0.1 μm to 0.5 μm. However, when the battery is overcharged, the PVDF-coating is insufficient to protect the battery from thermal runaway.

US Patent Application Publication No. US2013/0089794A1 discloses a rechargeable lithium battery comprising a positive electrode; a negative electrode; a separator between the positive electrode and the negative electrode, a polymer layer on the separator, the polymer layer comprising a polyvinylidene fluoride based polymer loaded at a loading level ranging from 0.5 g/m$^2$ to 3.0 g/m$^2$; and an electrolyte impregnating the separator, the electrolyte comprising an alkyl propionate. However, safety performance of the battery at overcharge is only provided for charging at a current of 700 mA and a voltage of 5.25V.

In view of the above, there is always a need to develop a lithium-ion battery having improved safety performance during overcharge.

SUMMARY OF THE INVENTION

The aforementioned needs are met by various aspects and embodiments disclosed herein.

Provided herein is a lithium-ion battery comprising an electrode assembly, wherein the electrode assembly comprises at least one cathode, at least one anode, and a separator interposed between the at least one cathode and the at least one anode;

wherein the separator comprises a porous base material, and a porous polymer layer coated on a surface of the porous base material and adjacent to the at least one cathode;

wherein the thickness of the porous polymer layer is from about 10 μm to about 30 μm; and wherein the surface density of the porous polymer layer is from about 9 g/m$^2$ to about 30 g/m$^2$.

In some embodiments, the melting point of the porous base material is at least about 30° C. higher than the melting point of the porous polymer layer or at least about 60° C. higher than the melting point of the porous polymer layer. In certain embodiments, the melting point of the porous base material is about 200° C. or above.

In certain embodiments, the porous base material is a membrane, a non-woven fabric or a woven fabric. In some embodiments, the porous base material is a polymer selected from the group consisting of polyethylene terephthalate, polybutylene terephthalate, polyethylene naphthalene, polybutylene naphthalate, polyacetal, polyamide, polycarbonate, polyimide, polyetherether ketone, polysulfones, polyphenylene oxide, polyphenylene sulfide, polyacrylonitrile, polyvinylidene fluoride, poly(vinylidene fluoride)-hexafluoropropene, polyvinyl pyrrolidone, and combinations thereof. In some embodiments, the thickness of the porous base material is from about 5 μm to about 25 μm.

In certain embodiments, the thickness of the porous polymer layer is from about 13 μm to about 25 μm. In some embodiments, the surface density of the porous polymer layer is from about 11 g/m$^2$ to about 25 g/m$^2$.

In some embodiments, the porous polymer layer comprises a polymer selected from the group consisting of polyvinylidene fluoride, poly(vinylidene fluoride)-hexafluoropropene, polyacrylonitrile, polyvinyl chloride, polystyrene, polyimide, polyamide, polyacetal, polycarbonate, polyetherether ketone, polysulfone, polyphenylene oxide, polyphenylene sulphide, polyvinylpyrrolidone, polyethylene terephthalate, polybutylene terephthalate, polyethylene naphthalene, polybutylene naphthalate, polymethyl methacrylate, polymethylene oxide, polytetrafluoroethylene, polyvinyl fluoride, polyethylene, high-density polyethylene, linear low-density polyethylene, low-density polyethylene, ultra high molecular weight polyethylene, polypropylene, polybutylene, polypentene, and combinations thereof. In certain embodiments, the amount of the polymer in the porous polymer layer is from about 70% to about 100% by weight, based on the total weight of the porous polymer layer.

In certain embodiments, the porous polymer layer further comprises an inorganic material selected from the group consisting of Al$_2$O$_3$, SiO$_2$, TiO$_2$, ZrO$_2$, Mg(OH)$_2$, MgO, SnO$_2$, CaCO$_3$, BaSO$_4$, TiN, AlN, Na$_2$O.mTiO$_2$, K$_2$O.nTiO$_2$, BaO$_x$, MTiO$_3$, and combinations thereof, wherein m is 3 or 6, n is 1, 2, 4, 6, or 8, x is 1 or 2, and M is Ba, Sr, or Ca. In some embodiments, the amount of the inorganic material is from about 0.01% to about 30% by weight, based on the total weight of the porous polymer layer. In certain embodiments, the diameter of the inorganic material is from about 1 nm to about 1 μm, or from about 1 μm to about 5 μm.

In some embodiments, the thickness of the separator is from about 15 μm to about 40 μm. In certain embodiments, the porosity of the separator is from about 30% to about 55%. In some embodiments, the Gurley value of the separator is from about 5 seconds/100 cm$^3$ to about 200 seconds/100 cm$^3$.

In certain embodiments, the separator is free of a dispersant, surfactant, plasticizer, or combinations thereof.

In some embodiments, the electrode assembly is constructed as a Z-folded stack of the at least one anode, at least one cathode and the separator.

In certain embodiments, the ratio of the width of the separator to the width of the at least one cathode is greater than about 1.

DETAILED DESCRIPTION OF THE INVENTION

Figure 1:
FIG. 1 illustrates an image of the cathode surface of Example 4 after overcharge test.

Provided herein is a lithium-ion battery comprising an electrode assembly, wherein the electrode assembly comprises at least one cathode, at least one anode, and a separator interposed between the at least one cathode and the at least one anode;

wherein the separator comprises a porous base material, and a porous polymer layer coated on a surface of the porous base material and adjacent to the at least one cathode;

wherein the thickness of the porous polymer layer is from about 10 μm to about 30 μm; and wherein the surface density of the porous polymer layer is from about 9 g/m² to about 30 g/m².

The term "porous base material" refers to a substrate having pores or voids inside. The material used as a component of the porous base material may be an organic material or an inorganic material as long as the material is an electrically insulating material. Any porous base material that has an electrically insulating property can be used herein. Some non-limiting examples of the porous base material include a porous sheet formed of a fibrous material, such as woven or nonwoven fabric or a paper-like sheet. Some non-limiting examples of the fibrous material include natural and polymeric fibers.

The term "non-woven" refers to products made by processes that do not include weaving nor knitting. The fibers in these materials are bonded together by chemical, mechanical, heat or solvent treatment.

The term "polymer" refers to a polymeric compound prepared by polymerizing monomers, whether of the same or a different type. The generic term "polymer" embraces the terms "homopolymer," "copolymer," "terpolymer" as well as "interpolymer."

The term "polyester" refers to a polymer having an ester functional group in each repeating unit on its main chain. Some non-limiting examples of suitable polyester include polyethylene terephthalate (PET), polybutylene terephthalate (PBT), polyethylene naphthalate (PEN), and poly(cyclohexanedimethylene terephthalate) (PCT).

The term "electrode" refers to a "cathode" or an "anode."

The term "positive electrode" is used interchangeably with cathode. Likewise, the term "negative electrode" is used interchangeably with anode.

The term "conductive agent" refers to a material which is chemically inactive and has good electrical conductivity. Therefore, the conductive agent is often mixed with an electrode active material at the time of forming an electrode to improve electrical conductivity of the electrode.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3,600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Generally, a porous polyolefin material is used as a separator to separate a cathode and an anode in lithium-ion batteries. A major disadvantage of these polyolefin-based separators is their low thermal stability limit. When the battery temperature exceeds the melting of the separator during overcharge, the polyolefin separator rapidly shrinks leading to direct contact of the cathode and anode, causing thermal runaway.

The separator disclosed herein comprises a porous base material and a porous polymer layer coated onto a surface of the porous base material, wherein the porous polymer layer is arranged adjacent to a cathode. When a battery is subjected to unusual circumstances such as overcharge, excessive amounts of heat will be released. The porous polymer layer will melt at the melting temperature of the porous polymer layer, forming a barrier film over the surface of the cathode. The melted polymer layer with high impedance covering the surface of the cathode will act as a barrier to stop or restrict current flow, thereby reducing the temperature inside the battery and preventing the onset of thermal runaway.

In some embodiments, both the anode and cathode are smaller in size than the separator, and the anode and cathode are placed within the size of the separator. The separator sheet is arranged in a z-fold configuration so that cathode and anode are positioned on opposite sides of a separator. Since the porous polymer layer coated on the porous base material is arranged adjacent to a cathode and the size of the separator is larger than that of the cathode, both surfaces and the 4 edges of the cathode can be covered by the polymer layer when the porous polymer layer melts in order to prevent the cathode and the anode from coming into contact with each other. This prevents thermal runaway of the secondary lithium-ion battery cell when it is overcharged. FIG. 1 shows a cathode surface covered with an intact PVDF film after dissembling the cell and separating the anode, separator and cathode.

Figure 2:
FIG. 2 illustrates an image of the anode surface of Comparative Example 3 after overcharge test.

Unexpectedly, when the porous polymer layer coated on the porous base material is arranged adjacent to an anode, the separator cannot prevent thermal runaway after overcharge. FIG. 2 shows an anode surface partly covered by a PVDF film due to formation of cracks and holes on the film after dissembling the cell and separating the anode, separator and cathode. The lithium dendrites formed on the surface of the anode can lead to uneven distribution of the melted polymer on the surface of anode. This can cause short-circuit by which the anode and the cathode are electrically connected to each other. In this case, the lithium ion battery may encounter a dangerous situation. Under abusive conditions, lithium-ion cells undergo thermal runaway, producing exceedingly high temperatures, smoke, explosion and fire. In some embodiments, the porous polymer layer is only coated on one side of the porous base material, and cell stack comprises at least one anode adjacent to the porous base material and at least one cathode adjacent to the porous polymer layer.

In some embodiments, the separator has a porous base material and a porous polymer layer coated thereon. In certain embodiments, the porous base material is a polymeric membrane. In some embodiments, the porous base material is a woven fabric or non-woven fabric made of polymeric fibers.

In some embodiments, the porous base material is a polymer selected from the group consisting of polyethylene terephthalate (PET), polybutylene terephthalate, polyethylene naphthalene, polybutylene naphthalate, polyacetal, polyamide, polycarbonate, polyimide, polyetherether ketone, polysulfones, polyphenylene oxide, polyphenylene sulfide, polyacrylonitrile, polyvinylidene fluoride (PVDF), poly(vinylidene fluoride)-hexafluoropropene, polyvinyl pyrrolidone, and combinations thereof. In certain embodiments, the polymer is not polyethylene terephthalate, polybutylene terephthalate, polyethylene naphthalene, polybutylene naphthalate, polyacetal, polyamide, polycarbonate, polyimide, polyetherether ketone, polysulfones, polyphenylene oxide, polyphenylene sulfide, polyacrylonitrile, polyvinylidene fluoride, poly(vinylidene fluoride)-hexafluoropropene, polyvinyl pyrrolidone, or combinations thereof.

In some embodiments, the porous base material is not a polyolefin. In certain embodiments, the porous base material is not a polyethylene (PE) or a polypropylene (PP). In some embodiments, the porous base material is not a PP/PE/PP tri-layer membrane, a PE/PP/PE tri-layer membrane, or a multi-layer polyolefin membrane.

In some embodiments, the porous base material has a melting point higher than a polyolefin separator. In certain embodiments, the melting point of the porous base material is from about 160° C. to about 400° C., from about 160° C. to about 350° C., from about 160° C. to about 300° C., from about 200° C. to about 400° C., from about 200° C. to about 350° C., from about 200° C. to about 300° C., or from about 250° C. to about 400° C. In some embodiments, the melting point of the porous base material is above about 160° C., above about 170° C., above about 180° C., above about 190° C., above about 200° C., above about 210° C., above about 220° C., above about 230° C., above about 240° C., above about 250° C., above about 260° C., above about 270° C., above about 280° C., above about 290° C., or above about 300° C. In certain embodiments, the melting point of the porous base material is less than about 500° C., less than about 450° C., less than about 400° C., less than about 350° C., less than about 300° C., or less than about 250° C.

In some embodiments, the porous polymer layer comprises a polymer selected from the group consisting of polyvinylidene fluoride, poly(vinylidene fluoride)-hexafluoropropene, polyacrylonitrile, polyvinyl chloride, polystyrene, polyimide, polyamide, polyacetal, polycarbonate, polyetherether ketone, polysulfone, polyphenylene oxide, polyphenylene sulphide, polyvinylpyrrolidone, polyethylene terephthalate, polybutylene terephthalate, polyethylene naphthalene, polybutylene naphthalate, polymethyl methacrylate, polymethylene oxide, polytetrafluoroethylene, polyvinyl fluoride, polyethylene, high-density polyethylene, linear low-density polyethylene, low-density polyethylene, ultra high molecular weight polyethylene, polypropylene, polybutylene, polypentene, and combinations thereof. In certain embodiments, the polymer is not polyvinylidene fluoride, poly(vinylidene fluoride)-hexafluoropropene, polyacrylonitrile, polyvinyl chloride, polystyrene, polyimide, polyamide, polyacetal, polycarbonate, polyetherether ketone, polysulfone, polyphenylene oxide, polyphenylene sulphide, polyvinylpyrrolidone, polyethylene terephthalate, polybutylene terephthalate, polyethylene naphthalene, polybutylene naphthalate, polymethyl methacrylate, polymethylene oxide, polytetrafluoroethylene, polyvinyl fluoride, polyethylene, high-density polyethylene, linear low-density polyethylene, low-density polyethylene, ultra high molecular weight polyethylene, polypropylene, polybutylene, polypentene, or combinations thereof.

In certain embodiments, the separator has a porous base material and a porous polymer layer coated thereon. In some embodiments, the porous polymer layer comprises a plurality of polymer particles. The porous polymer layer can be formed by spraying a slurry containing polymer particles on at least one surface of a porous base material. The polymer particles are spherical and spread out over the porous base material forming a particle mat. In certain embodiments, the diameter of the polymer particles is from about 1 nm to about 5 μm, from about 1 μm to about 5 μm, from about 1 μm to about 4 μm, from about 1 μm to about 3 μm, from about 1 μm to about 2 μm, from about 2 μm to about 5 μm, from about 2 μm to about 4 μm, from about 1 nm to about 1 μm, from about 1 nm to about 800 nm, from about 1 nm to about 600 nm, from about 1 nm to about 500 nm, from about 1 nm to about 300 nm, from about 1 nm to about 100 nm, from about 200 nm to about 1 µm, from about 200 nm to about 500 nm, from about 300 nm to about 900 nm, or from about 300 nm to about 700 nm. In some embodiments, the diameter of the polymer particles is less than about 5 µm, less than about 4 µm, less than about 3 µm, less than about 2 µm, less than about 1 µm, less than about 800 nm, less than about 600 nm, less than about 500 nm, less than about 300 nm, or less than about 100 nm. In certain embodiments, the diameter of the polymer particles is at least about 1 nm, at least about 100 nm, at least about 300 nm, at least about 500 nm, at least about 700 nm, at least about 900 nm, at least about 1 µm, at least about 2 µm, at least about 3 µm, or at least about 4 µm. Polymer particles having other shapes may be used for forming the porous polymer layer such as any combination of flattened, rectangular, triangular, or polygonal. In some embodiments, the porous polymer layer further comprises a binder material. The porous polymer layer can be formed by coating a mixture of polymer particles and a binder material on at least one surface of a porous base material.

In certain embodiments, the porous polymer layer does not comprise polymer particles and is a microporous film comprising pores that are evenly distributed throughout it.

In some embodiments, the melting point of the porous polymer layer is from about 100° C. to about 300° C., from about 100° C. to about 250° C., from about 150° C. to about 300° C., from about 150° C. to about 250° C., from about 150° C. to about 200° C., from about 170° C. to about 300° C., from about 170° C. to about 250° C., from about 200° C. to about 300° C., or from about 200° C. to about 250° C. In certain embodiments, the melting point of the porous polymer layer is less than about 300° C., less than about 280° C., less than about 260° C., less than about 250° C., less than about 240° C., less than about 220° C., less than about 200° C., less than about 190° C., less than about 180° C., less than about 170° C., or less than about 160° C.

The melting point of the porous base material is at least 30° C. higher than the melting point of the porous polymer layer. The difference in melting point can allow melting of the porous polymer layer but not the porous base material so that the porous base material can remain intact during melting of the porous polymer layer. If the porous base material shrinks during melting of porous polymer layer, the anode and cathode can come into contact, causing short circuit. In some embodiments, the melting point of the porous base material is higher than the melting point of the porous polymer layer by a temperature from about 30° C. to about 300° C., from about 30° C. to about 250° C., from about 30° C. to about 200° C., from about 30° C. to about 150° C., from about 50° C. to about 300° C., from about 50° C. to about 200° C., from about 50° C. to about 150° C., from about 70° C. to about 300° C., from about 70° C. to about 250° C., from about 70° C. to about 200° C., from about 100° C. to about 300° C., or from about 100° C. to about 250° C. In certain embodiments, the melting point of the porous base material is higher than the melting point of the porous polymer layer by a temperature of at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., at least about 90° C., at least about 95° C., at least about 100° C., at least about 110° C., at least about 120° C. at least about 130° C., at least about 140° C., at least about 150° C., at least about 170° C., at least about 200° C., or at least about 250° C.

When the thickness of the porous polymer layer is less than 10 µm, the effect of suppressing the exceedingly high temperature is not sufficient when overcharged, leading to fires or explosions. When the thickness of the porous polymer layer is more than 30 µm, the increased separator thickness increases the internal resistance of the lithium-ion battery and takes up space which could otherwise be filled with electrode active material, resulting in capacity decrease, voltage down and impaired energy density. In some embodiments, the thickness of the porous polymer layer is from about 10 µm to about 30 µm, from about 10 µm to about 28 µm, from about 10 µm to about 26 µm, from about 10 µm to about 25 µm, from about 10 µm to about 24 µm, from about 10 µm to about 22 µm, from about 10 µm to about 20 µm, from about 10 µm to about 18 µm, from about 10 µm to about 16 µm, from about 10 µm to about 15 µm, from about 12 µm to about 30 µm, from about 12 µm to about 28 µm, from about 12 µm to about 26 µm, from about 12 µm to about 25 µm, from about 12 µm to about 24 µm, from about 12 µm to about 22 µm, from about 12 µm to about 20 µm, from about 12 µm to about 18 µm, from about 12 µm to about 16 µm, from about 15 µm to about 30 µm, from about 15 µm to about 28 µm, from about 15 µm to about 26 µm, from about 15 µm to about 25 µm, from about 15 µm to about 20 µm, from about 18 µm to about 30 µm, from about 18 µm to about 28 µm, from about 18 µm to about 25 µm, from about 20 µm to about 30 µm, from about 20 µm to about 28 µm, from about 20 µm to about 25 µm, or from about 25 µm to about 30 µm. In certain embodiments, the thickness of the porous polymer layer is at least about 10 µm, at least about 11 µm, at least about 12 µm, at least about 13 µm, at least about 14 µm, at least about 15 µm, at least about 16 µm, at least about 17 µm, at least about 18 µm, at least about 19 µm, at least about 20 µm, at least about 21 µm, at least about 22 µm, at least about 23 µm, at least about 24 µm, at least about 25 µm, at least about 26 µm, at least about 27 µm, at least about 28 µm, or at least about 29 µm. In some embodiments, the thickness of the porous polymer layer is less than about 30 µm, less than about 29 µm, less than about 28 µm, less than about 27 µm, less than about 26 µm, less than about 25 µm, less than about 24 µm, less than about 23 µm, less than about 22 µm, less than about 21 µm, less than about 20 µm, less than about 19 µm, less than about 18 µm, less than about 17 µm, less than about 16 µm, less than about 15 µm, less than about 14 µm, less than about 13 µm, less than about 12 µm, or less than about 11 µm. In certain embodiments, the thickness of the porous polymer layer is about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, or about 30 µm.

In some embodiments, the thickness of the porous base material is from about 5 µm to about 25 µm, from about 5 µm to about 20 µm, from about 5 µm to about 15 µm, from about 10 µm to about 25 µm, from about 10 µm to about 20 µm, or from about 15 µm to about 25 µm. In certain embodiments, the thickness of the porous base material is less than about 25 µm, less than about 20 µm, less than about 15 µm, or less than about 10 µm. In some embodiments, the thickness of the porous base material is at least about 5 µm, at least about 10 µm, at least about 15 µm, or at least about 20 µm.

The increased separator thickness increases the resistance to ion movement across the separator. When a separator is used at a thickness of more than about 40 µm, the resistance substantially increases. In some embodiments, the thickness of the separator is from about 10 μm to about 40 μm, from about 10 μm to about 30 μm, from about 15 μm to about 40 μm, from about 15 μm to about 35 μm, from about 15 μm to about 30 μm, from about 15 μm to about 25 μm, from about 15 μm to about 20 μm, from about 20 μm to about 40 μm, from about 20 μm to about 35 μm, from about 20 μm to about 30 μm, from about 25 μm to about 40 μm, from about 25 μm to about 35 μm, or from about 30 μm to about 40 μm. In certain embodiments, the thickness of the separator is less than about 40 μm, less than about 35 μm, less than about 30 μm, less than about 25 μm, less than about 20 μm, or less than about 15 μm. In some embodiments, the thickness of the separator is at least about 10 μm, at least about 15 μm, at least about 20 μm, at least about 25 μm, at least about 30 μm, or at least about 35 μm.

When the surface density of the porous polymer layer is less than 9 g/m$^2$, the melted polymer is insufficient to ensure the safety of a battery. However, when the surface density of the porous polymer layer is more than 30 g/m$^2$, this associates with a reduced porosity and thus an increased electrical resistance in the cell since the electrolyte cannot diffuse through the separator readily, affecting the electrochemical performance of the battery. In some embodiments, the surface density of the porous polymer layer is from about 9 g/m$^2$ to about 30 g/m$^2$, from about 9 g/m$^2$ to about 28 g/m$^2$, from about 9 g/m$^2$ to about 26 g/m$^2$, from about 9 g/m$^2$ to about 25 g/m$^2$, from about 9 g/m$^2$ to about 24 g/m$^2$, from about 9 g/m$^2$ to about 22 g/m$^2$, from about 9 g/m$^2$ to about 20 g/m$^2$, from about 9 g/m$^2$ to about 18 g/m$^2$, from about 9 g/m$^2$ to about 16 g/m$^2$, from about 9 g/m$^2$ to about 15 g/m$^2$, from about 11 g/m$^2$ to about 30 g/m$^2$, from about 11 g/m$^2$ to about 28 g/m$^2$, from about 11 g/m$^2$ to about 26 g/m$^2$, from about 11 g/m$^2$ to about 25 g/m$^2$, from about 11 g/m$^2$ to about 24 g/m$^2$, from about 11 g/m$^2$ to about 22 g/m$^2$, from about 11 g/m$^2$ to about 20 g/m$^2$, from about 11 g/m$^2$ to about 18 g/m$^2$, from about 15 g/m$^2$ to about 30 g/m$^2$, from about 15 g/m$^2$ to about 28 g/m$^2$, from about 15 g/m$^2$ to about 26 g/m$^2$, from about 15 g/m$^2$ to about 25 g/m$^2$, from about 15 g/m$^2$ to about 24 g/m$^2$, from about 15 g/m$^2$ to about 22 g/m$^2$, from about 15 g/m$^2$ to about 20 g/m$^2$, from about 18 g/m$^2$ to about 30 g/m$^2$, from about 18 g/m$^2$ to about 28 g/m$^2$, from about 18 g/m$^2$ to about 26 g/m$^2$, from about 18 g/m$^2$ to about 25 g/m$^2$, from about 18 g/m$^2$ to about 24 g/m$^2$, from about 20 g/m$^2$ to about 30 g/m$^2$, from about 20 g/m$^2$ to about 28 g/m$^2$, from about 20 g/m$^2$ to about 26 g/m$^2$, from about 20 g/m$^2$ to about 25 g/m$^2$, from about 22 g/m$^2$ to about 30 g/m$^2$, from about 22 g/m$^2$ to about 28 g/m$^2$, or from about 25 g/m$^2$ to about 30 g/m$^2$. In certain embodiments, the surface density of the porous polymer layer is at least about 9 g/m$^2$, at least about 10 g/m$^2$, at least about 11 g/m$^2$, at least about 12 g/m$^2$, at least about 13 g/m$^2$, at least about 14 g/m$^2$, at least about 15 g/m$^2$, at least about 16 g/m$^2$, at least about 17 g/m$^2$, at least about 18 g/m$^2$, at least about 19 g/m$^2$, at least about 20 g/m$^2$, at least about 21 g/m$^2$, at least about 22 g/m$^2$, at least about 23 g/m$^2$, at least about 24 g/m$^2$, at least about 25 g/m$^2$, at least about 26 g/m$^2$, at least about 27 g/m$^2$, at least about 28 g/m$^2$, or at least about 29 g/m$^2$. In some embodiments, the surface density of the porous polymer layer is less than about 30 g/m$^2$, less than about 29 g/m$^2$, less than about 28 g/m$^2$, less than about 27 g/m$^2$, less than about 26 g/m$^2$, less than about 25 g/m$^2$, less than about 24 g/m$^2$, less than about 23 g/m$^2$, less than about 22 g/m$^2$, less than about 21 g/m$^2$, less than about 20 g/m$^2$, less than about 19 g/m$^2$, less than about 18 g/m$^2$, less than about 17 g/m$^2$, less than about 16 g/m$^2$, less than about 15 g/m$^2$, less than about 14 g/m$^2$, less than about 13 g/m$^2$, less than about 12 g/m$^2$, less than about 11 g/m$^2$, or less than about 10 g/m$^2$. In certain embodiments, the surface density of the porous polymer layer is about 10 g/m$^2$, about 11 g/m$^2$, about 12 g/m$^2$, about 13 g/m$^2$, about 14 g/m$^2$, about 15 g/m$^2$, about 16 g/m$^2$, about 17 g/m$^2$, about 18 g/m$^2$, about 19 g/m$^2$, about 20 g/m$^2$, about 21 g/m$^2$, about 22 g/m$^2$, about 23 g/m$^2$, about 24 g/m$^2$, about 25 g/m$^2$, about 26 g/m$^2$, about 27 g/m$^2$, about 28 g/m$^2$, about 29 g/m$^2$, or about 30 g/m$^2$.

In some embodiments, the surface density of the porous base material is from about 1 g/m$^2$ to about 25 g/m$^2$, from about 1 g/m$^2$ to about 20 g/m$^2$, from about 1 g/m$^2$ to about 15 g/m$^2$, from about 1 g/m$^2$ to about 10 g/m$^2$, from about 5 g/m$^2$ to about 25 g/m$^2$, from about 5 g/m$^2$ to about 20 g/m$^2$, from about 5 g/m$^2$ to about 15 g/m$^2$, from about 10 g/m$^2$ to about 25 g/m$^2$, from about 10 g/m$^2$ to about 20 g/m$^2$, or from about 10 g/m$^2$ to about 15 g/m$^2$. In certain embodiments, the surface density of the porous base material is less than about 25 g/m$^2$, less than about 20 g/m$^2$, less than about 15 g/m$^2$, less than about 10 g/m$^2$, or less than about 5 g/m$^2$. In some embodiments, the surface density of the porous base material is greater than about 1 g/m$^2$, greater than about 5 g/m$^2$, greater than about 10 g/m$^2$, greater than about 15 g/m$^2$, or greater than about 20 g/m$^2$.

Each of the porous base material and the porous polymer layer independently comprises a plurality of pores extending from the top surface to the bottom surface of the porous base material and porous polymer layer for lithium ion movement. In some embodiments, the porous base material and porous polymer layer have the same pore pattern. In certain embodiments, the porous base material and porous polymer layer have different pore patterns. In some embodiments, the pore patterns of the pores of the porous base material and/or porous polymer layer at the top surface and bottom surface may be the same or different. In certain embodiments, some of the pores of the porous base material and the porous polymer layer interconnect to form a continuous porous network across the separator. In certain embodiments, each of the porous base material and the porous polymer layer independently comprises straight and/or curved channels. In some embodiments, some of the channels of the porous base material and the porous polymer layer are not interconnected to each other. In certain embodiments, the channels in each of the porous base material and the porous polymer layer are independently not straight or curved.

The risk of an internal short circuit is greatly diminished by the separator of the present invention, while the permeability of the separator is not negatively impacted. In some embodiments, the pore size of the porous base material is from about 2 μm to about 50 μm, from about 2 μm to about 40 μm, from about 2 μm to about 30 μm, from about 2 μm to about 20 μm, from about 2 μm to about 10 μm, from about 10 μm to about 50 μm, from about 10 μm to about 40 μm, from about 10 μm to about 30 μm, or from about 20 μm to about 40 μm. In certain embodiments, the pore size of the porous base material is less than about 50 μm, less than about 40 μm, less than about 30 μm, less than about 20 μm, or less than about 10 μm. In some embodiments, the pore size of the porous base material is greater than about 2 μm, greater than about 10 μm, greater than about 20 μm, greater than about 30 μm, or greater than about 40 μm.

In certain embodiments, the pore size of the porous polymer layer is from about 50 nm to about 2 μm, from about 50 nm to about 1 μm, from about 50 nm to about 800 nm, from about 50 nm to about 600 nm, from about 50 nm to about 500 nm, from about 50 nm to about 300 nm, or from about 50 nm to about 200 nm. In some embodiments, the pore size of the porous polymer layer is less than about 2 μm, less than about 1 µm, less than about 800 nm, less than about 600 nm, less than about 500 nm, less than about 300 nm, or less than about 100 µm. In certain embodiments, the pore size of the porous polymer layer is at least about 50 nm, at least about 100 nm, at least about 300 nm, at least about 500 nm, at least about 700 nm, at least about 900 nm, or at least about 1 µm.

In some embodiments, the pore size of the separator is from about 50 nm to about 50 µm, from about 50 nm to about 30 µm, from about 50 nm to about 10 µm, from about 50 nm to about 1 µm, from about 50 nm to about 500 nm, from about 500 nm to about 50 µm, from about 500 nm to about 10 µm, or from about 500 nm to about 1 µm. In certain embodiments, the pore size of the separator is less than about 50 µm, less than about 30 µm, less than about 10 µm, less than about 1 µm, or less than about 500 nm. In some embodiments, the pore size of the separator is greater than about 50 nm, greater than about 500 nm, greater than about 1 µm, greater than about 10 µm, or greater than about 30 µm.

In some embodiments, the porosity of the porous base material is from about 1% to about 40%, from about 1% to about 35%, from about 1% to about 30%, from about 1% to about 25%, from about 1% to about 20%, from about 1% to about 15%, from about 1% to about 10%, from about 1% to about 5%, from about 3% to about 40%, from about 3% to about 30%, from about 3% to about 20%, from about 3% to about 10%, from about 10% to about 40%, from about 10% to about 30%, from about 10% to about 20%, or from about 20% to about 40%. In certain embodiments, the porosity of the porous base material is less than about 40%, less than about 35%, less than about 30%, less than about 25%, less than about 20%, less than about 15%, less than about 10%, or less than about 5%. In some embodiments, the porosity of the porous base material is greater than about 1%, greater than about 2%, greater than about 3%, greater than about 4%, greater than about 5%, greater than about 10%, greater than about 15%, greater than about 20%, greater than about 25%, greater than about 30%, or greater than about 35%.

In certain embodiments, the porosity of the separator is from about 30% to about 55%, from about 30% to about 50%, from about 30% to about 45%, from about 30% to about 40%, from about 30% to about 35%, from about 40% to about 55%, from about 40% to about 50%, or from about 45% to about 55%. In some embodiments, the porosity of the separator is less than about 55%, less than about 50%, less than about 45%, less than about 40%, or less than about 35%. In certain embodiments, the porosity of the separator is greater than about 30%, greater than about 35%, greater than about 40%, greater than about 45%, or greater than about 50%.

Gurley value is a unit of measurement determining the permeability or tortuosity of porous membranes. A low Gurley value ensures a good microscopic mass transfer through the separator. The mass transfer correlates with the resistance in the battery cell. In some embodiments, each of the Gurley values of the porous base material and the separator is independently from about 1 second/100 cm$^3$ to about 200 seconds/100 cm$^3$, from about 1 second/100 cm$^3$ to about 150 seconds/100 cm$^3$, from about 1 second/100 cm$^3$ to about 100 seconds/100 cm$^3$, from about 1 second/100 cm$^3$ to about 50 seconds/100 cm$^3$, from about 1 second/100 cm$^3$ to about 20 seconds/100 cm$^3$, from about 50 seconds/100 cm$^3$ to about 200 seconds/100 cm$^3$, from about 50 seconds/100 cm$^3$ to about 150 seconds/100 cm$^3$, or from about 100 seconds/100 cm$^3$ to about 200 seconds/100 cm$^3$. In certain embodiments, each of the Gurley values of the porous base material and the separator is independently less than about 200 seconds/100 cm$^3$, less than about 150 seconds/100 cm$^3$, less than about 100 seconds/100 cm$^3$, less than about 50 seconds/100 cm$^3$, less than about 20 seconds/100 cm$^3$, less than about 15 seconds/100 cm$^3$, less than about 10 seconds/100 cm$^3$, less than about 8 seconds/100 cm$^3$, less than about 6 seconds/100 cm$^3$, less than about 5 seconds/100 cm$^3$, or less than about 4 seconds/100 cm$^3$. In some embodiments, each of the Gurley values of the porous base material and the separator is independently greater than about 1 second/100 cm$^3$, greater than about 10 seconds/100 cm$^3$, greater than about 20 seconds/100 cm$^3$, greater than about 50 seconds/100 cm$^3$, greater than about 100 seconds/100 cm$^3$, or greater than about 150 seconds/100 cm$^3$.

In certain embodiments, the porous polymer layer further comprises an inorganic material selected from the group consisting of $Al_2O_3$, $SiO_2$, $TiO_2$, $ZrO_2$, $Mg(OH)_2$, MgO, $SnO_2$, $CaCO_3$, $BaSO_4$, TiN, AlN, $Na_2O \cdot mTiO_2$, $K_2O \cdot nTiO_2$, $BaO_x$, $MTiO_3$, and combinations thereof, wherein m is 3 or 6, n is 1, 2, 4, 6, or 8, x is 1 or 2, and M is Ba, Sr, or Ca. The inorganic material is homogeneously distributed in the porous polymer layer. In some embodiments, the porous polymer layer is free of an inorganic material. In certain embodiments, the inorganic material is not $Al_2O_3$, $SiO_2$, $TiO_2$, $ZrO_2$, $Mg(OH)_2$, MgO, $SnO_2$, $CaCO_3$, $BaSO_4$, TiN, AlN, $Na_2O \cdot mTiO_2$, $K_2O \cdot nTiO_2$, $BaO_x$, $MTiO_3$, or combinations thereof, wherein m is 3 or 6, n is 1, 2, 4, 6, or 8, x is 1 or 2, and M is Ba, Sr, or Ca. The porous polymer layer comprising an inorganic material displays an increased mechanical stability, improving puncture resistance for the separator.

The inorganic material may be spherical, platelets, discs, needle-shaped, cylindrical, irregular, or other known particle shapes. In some embodiments, the inorganic material is not spherical, platelets, discs, needle-shaped, cylindrical, or irregular.

In certain embodiments, the diameter of the inorganic material is from about 1 nm to about 5 µm, from about 1 nm to about 1 µm, from about 1 µm to about 5 µm, from about 1 nm to about 800 nm, from about 1 nm to about 600 nm, from about 1 nm to about 500 nm, from about 1 nm to about 400 nm, from about 1 nm to about 200 nm, from about 100 nm to about 1 µm, from about 100 nm to about 500 nm, from about 300 nm to about 800 nm, from about 1 µm to about 4 µm, from about 1 µm to about 3 µm, from about 1 µm to about 2 µm, or from about 2 µm to about 4 µm. In some embodiments, the diameter of the inorganic material is less than about 5 µm, less than about 4 µm, less than about 3 µm, less than about 2 µm, less than about 1 µm, less than about 800 nm, less than about 600 nm, less than about 500 nm, less than about 300 nm, or less than about 100 nm. In certain embodiments, the diameter of the inorganic material is greater than about 1 µm, greater than about 100 nm, greater than about 300 µm, greater than about 500 nm, greater than about 700 µm, greater than about 900 nm, greater than about 1 µm, or greater than about 3 µm.

In some embodiments, the porous polymer layer comprises a mixture of the inorganic material and polymer selected from the group consisting of polyvinylidene fluoride, poly(vinylidene fluoride)-hexafluoropropene, polyacrylonitrile, polyvinyl chloride, polystyrene, polyamide, polyacetal, polyetherether ketone, polysulfone, polyphenylene oxide, polyphenylene sulphide, polyvinylpyrrolidone, polymethyl methacrylate, polymethylene oxide, polytetrafluoroethylene, polyvinyl fluoride, polyethylene, high-density polyethylene, linear low-density polyethylene, low-density polyethylene, ultra high molecular weight polyethylene, polypropylene, polybutylene, polypentene, and combinations thereof. In certain embodiments, the polymer is a major component in the porous polymer layer. In some embodiments, the amount of the polymer in the porous polymer layer is from about 70% to about 99%, from about 75% to about 99%, from about 80% to about 99%, from about 85% to about 99%, from about 90% to about 99%, from about 70% to about 95%, from about 70% to about 90%, from about 70% to about 85%, from about 80% to about 95%, from about 85% to about 95%, or from about 80% to about 90% by weight, based on the total weight of the porous polymer layer. In certain embodiments, the amount of the polymer in the porous polymer layer is less than about 99%, less than about 95%, less than about 90%, less than about 85%, or less than about 80% by weight, based on the total weight of the porous polymer layer. In some embodiments, the amount of the polymer in the porous polymer layer is greater than about 70%, greater than about 75%, greater than about 80%, greater than about 85%, greater than about 90%, greater than about 95%, or greater than about 99% by weight, based on the total weight of the porous polymer layer. In certain embodiments, the amount of the polymer in the porous polymer layer is about 70%, about 75%, about 80%, about 85%, about 90%, about 95%, or about 99% by weight, based on the total weight of the porous polymer layer.

In certain embodiments, the inorganic material is a minor component in the porous polymer layer. In some embodiments, the amount of the inorganic material in the porous polymer layer is from about 0.1% to about 50%, from about 0.1% to about 40%, from about 0.1% to about 30%, from about 0.1% to about 20%, from about 0.1% to about 10%, from about 0.1% to about 5%, from about 0.1% to about 4%, from about 0.1% to about 3%, from about 0.1% to about 2%, from about 0.1% to about 1%, from about 0.1% to about 0.5%, from about 1% to about 30%, from about 1% to about 25%, from about 1% to about 20%, from about 1% to about 15%, from about 1% to about 10%, from about 1% to about 8%, from about 1% to about 6%, from about 1% to about 5%, from about 1% to about 4%, from about 1% to about 3%, from about 1% to about 2%, from about 2% to about 10%, or from about 3% to about 10% by weight, based on the total weight of the porous polymer layer. In certain embodiments, the amount of the inorganic material in the porous polymer layer is less than about 50%, less than about 40%, less than about 30%, less than about 25%, less than about 20%, less than about 15%, less than about 10%, less than about 5%, less than about 4%, less than about 3%, less than about 2%, less than about 1%, less than about 0.5%, or less than about 0.1% by weight, based on the total weight of the porous polymer layer. In some embodiments, the amount of the inorganic material in the porous polymer layer is more than about 0.1%, more than about 0.5%, more than about 1%, more than about 2%, more than about 3%, more than about 4%, more than about 5%, more than about 10%, more than about 15%, more than about 20%, or more than about 25% by weight, based on the total weight of the porous polymer layer. In certain embodiments, the amount of the inorganic material in the porous polymer layer is about 0.1%, about 0.5%, about 1%, about 2%, about 3%, about 4%, about 5%, about 10%, about 15%, about 20%, about 25%, or about 30% by weight, based on the total weight of the porous polymer layer.

In some embodiments, the ratio of the amount of the polymer to the amount of the inorganic material in the porous polymer layer is from about 5:1 to about 100:1, from about 6:1 to about 100:1, from about 7:1 to about 100:1, from about 7.5:1 to about 100:1, from about 8:1 to about 100:1, from about 8.5:1 to about 100:1, from about 9:1 to about 100:1, from about 9.5:1 to about 100:1, from about 8:1 to about 50:1, from about 8.5:1 to about 50:1, from about 9:1 to about 50:1, or from about 9:1 to about 20:1. In certain embodiments, the ratio of the amount of the polymer to the amount of the inorganic material in the porous polymer layer is at least about 5:1, at least about 5.5:1, at least about 6:1, at least about 6.5:1, at least about 7:1, at least about 7.5:1, at least about 8:1, at least 8.5:1, or at least about 9:1.

In some embodiments, the porous polymer layer further comprises a binder material. In certain embodiments, the binder material is selected from the group consisting of styrene-butadiene rubber (SBR), carboxymethyl cellulose (CMC), polyvinylidene fluoride, acrylonitrile copolymer, polyacrylic acid, polyacrylonitrile, poly(vinylidene fluoride)-hexafluoropropene, latex, a salt of alginic acid, LA132, LA133, and combinations thereof. In some embodiments, the salt of alginic acid comprises a cation selected from Na, Li, K, Ca, $NH_4$, Mg, Al, or a combination thereof. In certain embodiments, the porous polymer layer is free of a binder material.

In certain embodiments, the amount of the binder material in the porous polymer layer is from about 0.1% to about 20%, from about 0.1% to about 15%, from about 0.1% to about 10%, from about 0.1% to about 8%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, from about 1% to about 20%, from about 1% to about 15%, from about 1% to about 10%, from about 1% to about 8%, from about 1% to about 6%, from about 1% to about 5%, from about 1% to about 4%, or from about 2% to about 10% by weight, based on the total weight of the porous polymer layer. In some embodiments, the amount of the binder material in the porous polymer layer is less than about 20%, less than about 15%, less than about 10%, less than about 5%, less than about 4%, less than about 3%, less than about 2%, less than about 1%, or less than about 0.5% by weight, based on the total weight of the porous polymer layer. In certain embodiments, the amount of the binder material in the porous polymer layer is at least about 0.1%, at least about 0.5%, at least about 1%, at least about 2%, at least about 3%, at least about 4%, at least about 5%, at least about 10%, or at least about 15% by weight, based on the total weight of the porous polymer layer.

In some embodiments, the porous polymer layer further comprises an additive such as a dispersant, a surfactant, or a plasticizer. In some embodiments, the dispersant is polycarboxylic acids, N,N-dimethylacrylamide, N,N-dimethylaminoethyl acrylate, acrylonitrile, ethyl acrylate, n-butyl arylate, isobutyl acrylate, acrylic acid, hydroxbutyl acrylate, or combinations thereof. In certain embodiments, the plasticizer is phthalate-based esters, cyclic carbonates, polymeric carbonates, or combinations thereof. The use of additive improves the mechanical strength of the separator.

When the amount of the dispersants, surfactant, or plasticizer in the porous polymer layer is more than 10% by weight, based on the total weight of the porous polymer layer, the electrochemical performance of the battery is lowered. In some embodiments, the amount of the dispersant, surfactant, or plasticizer in the porous polymer layer is from about 0.1% to about 10%, from about 0.1% to about 8%, from about 0.1% to about 6%, from about 0.1% to about 5%, from about 0.1% to about 4%, from about 0.1% to about 3%, from about 0.1% to about 2%, from about 0.1% to about 1%, from about 0.1% to about 0.5%, from about 1% to about 10%, from about 1% to about 8%, from about 1% to about 6%, from about 1% to about 5%, from about 1% to about 4%, from about 1% to about 3%, from about 2% to about 10%, from about 2% to about 8%, or from about 3% to about 9% by weight, based on the total weight of the porous polymer layer. In certain embodiments, the amount of the dispersant, surfactant, or plasticizer in the porous polymer layer is less than about 20%, less than about 15%, less than about 10%, less than about 8%, less than about 6%, less than about 5%, less than about 4%, less than about 3%, less than about 2%, less than about 1%, less than about 0.5%, or less than about 0.1% by weight, based on the total weight of the porous polymer layer. In some embodiments, the porous polymer layer is free of an additive.

The electrode assembly comprises at least one cathode, at least one anode and a separator interposed between the at least one cathode and the at least one anode. An electrode assembly can be formed by folding a sheet of separator into a shape having a plurality of Z-shaped folding, and a cathode and an anode are arranged in each of the folding alternately. The anodes are arranged on a side of the separator at regular intervals, and the cathodes are arranged on the other side of the separator at regular intervals. In some embodiments, the electrode assembly is constructed as a Z-folded stack. In certain embodiments, the electrode assembly has a jelly-roll configuration.

In some embodiments, the width of the separator is larger than the width of the at least one cathode and the at least one anode to ensure that the cathode and anode do not contact with each other. When the porous polymer layer melts, the pores of the porous polymer layer close and the melted polymer forms an insulating layer covering the two surfaces of the cathode. The width is measured in a direction perpendicular to the folding or rolling direction of the separator. In some embodiments, the ratio of the width of the separator to the width of the at least one cathode is from about 1.01 to about 1.3, from about 1.01 to about 1.25, from about 1.01 to about 1.2, from about 1.01 to about 1.15, from about 1.01 to about 1.1, from about 1.01 to about 1.05, from about 1.05 to about 1.3, from about 1.05 to about 1.25, from about 1.05 to about 1.2, from about 1.05 to about 1.15, from about 1.05 to about 1.1, from about 1.1 to about 1.3, from about 1.1 to about 1.25, from about 1.1 to about 1.2, from about 1.1 to about 1.15, from about 1.15 to about 1.3, from about 1.15 to about 1.25, from about 1.15 to about 1.2, from about 1.2 to about 1.3, or from about 1.2 to about 1.25. In certain embodiments, the ratio of the width of the separator to the width of the at least one cathode is less than about 1.3, less than about 1.25, less than about 1.2, less than about 1.15, less than about 1.1, less than about 1.05, or less than about 1.01. In some embodiments, the ratio of the width of the separator to the width of the at least one cathode is more than about 1.01, more than about 1.05, more than about 1.1, more than about 1.15, more than about 1.2, or more than about 1.25. In certain embodiments, the ratio of the width of the separator to the width of the at least one cathode is about 1.01, about 1.05, about 1.1, about 1.15, about 1.2, about 1.25, or about 1.3. In other embodiments, the width of the separator is not the same as the width of the at least one cathode, and the width of the at least one cathode is larger than the width of the at least one anode.

The at least one cathode comprises a cathode electrode layer coated on one or both surfaces of a cathode current collector. The at least one anode comprises an anode electrode layer coated on one or both surfaces of an anode current collector. In some embodiments, each of the current collectors of the at least one cathode and the at least one anode, which can be in the form of a foil, sheet or film, is independently stainless steel, titanium, nickel, aluminum, copper or electrically-conductive resin. In certain embodiments, the current collector of the at least one cathode is an aluminum thin film. In some embodiments, the current collector of the at least one anode is a copper thin film.

The cathode electrode layer comprises a cathode active material, a conductive agent and a binder material. The anode electrode layer comprises an anode active material, a conductive agent and a binder material.

A cathode electrode layer or an anode electrode layer can be manufactured by coating a cathode or anode slurry comprising a cathode active material or an anode active material, a conductive agent and a binder material dispersed in a solvent onto a cathode or anode current collector, following by drying.

In some embodiments, each of the solvent of the cathode slurry and the anode slurry is independently selected from the group consisting of N-methyl-2-pyrrolidone, dimethylformamide, dimethyl sulfoxide, acetonitrile, butylene carbonate, propylene carbonate, ethyl bromide, tetrahydrofuran, dimethyl carbonate, diethyl carbonate, ethyl methyl carbonate, methyl propyl carbonate, ethylene carbonate, water, pure water, de-ionized water, distilled water, ethanol, isopropanol, methanol, acetone, n-propanol, t-butanol, and combinations thereof.

Aqueous solvent can be used as a solvent to prepare a cathode slurry or an anode slurry to reduce the use of hazardous organic solvent. In certain embodiments, each of the solvents of the cathode slurry and the anode slurry is independently free of an organic solvent. In some embodiments, each of the solvents of the cathode slurry and the anode slurry is independently free of N-methyl-2-pyrrolidone.

The threshold of triggering thermal runaway is also correlated with energy density of the cathode active material and the capacity of the cells. The larger the cells are and/or the higher energy density of the cathode active material is used, the more problematic the overcharged batteries since more energy is stored in the cell.

In some embodiments, the cathode active material is a lithium transition metal oxide selected from the group consisting of $Li_{1-x}Ni_aMn_bCo_cAl_{(1-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiNi_{0.5}Mn_{1.5}O_4$, $LiNi_{0.4}Mn_{1.6}O_4$, and combinations thereof; wherein $0 \leq x \leq 0.2$, $0 < a \leq 1$, $0 \leq b < 1$, $0 \leq c < 1$, and $a+b+c \leq 1$.

In certain embodiments, the cathode active material is a nickel-containing cathode active material selected from the group consisting of $Li_{1+x}NiO_2$, $Li_{1+x}Ni_aMn_bO_2$, $Li_{1+x}Ni_aCo_cO_2$, $Li_{1+x}Ni_aMn_bCo_cO_2$, $Li_{1+x}Ni_aCo_cAl_{(1-a-c)}O_2$, and combinations thereof; wherein $0 \leq x \leq 0.2$, $0 < a \leq 1$, $0 \leq b \leq 1$, $0 \leq c \leq 1$, and $a+b+c \leq 1$. In certain embodiments, the cathode active material is a nickel-containing cathode active material selected from the group consisting of $Li_{1+x}NiO_2$, $Li_{1+x}Ni_aMn_bO_2$, $Li_{1+x}Ni_aCo_cO_2$, $Li_{1+x}Ni_aMn_bCo_cO_2$, $Li_{1+x}Ni_aCo_cAl_{(1-a-c)}O_2$, and combinations thereof; wherein $0 \leq x \leq 0.2$, $0.3 \leq a \leq 1$, $0 \leq b \leq 0.6$, $0 \leq c \leq 0.6$, and $a+b+c \leq 1$. In some embodiments, the cathode active material is a nickel-rich cathode active material selected from the group consisting of $Li_{1+x}NiO_2$, $Li_{1+x}Ni_aMn_bO_2$, $Li_{1-x}Ni_aCo_cO_2$, $Li_{1+x}Ni_aMn_bCo_cO_2$, $Li_{1+x}Ni_aCo_cAl_{(1-a-c)}O_2$, and combinations thereof; wherein $0 \leq x \leq 0.2$, $0.5 \leq a \leq 1$, $0 \leq b \leq 0.3$, $0 \leq c \leq 0.3$, and $a+b+c \leq 1$.

In certain embodiments, the cathode active material is selected from the group consisting of $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.8}Mn_{0.05}Co_{0.15}O_2$, $Li_{0.9}Mn_{0.05}Co_{0.05}O_2$, $LiNi_{0.92}Mn_{0.04}Co_{0.04}O_2$, $LiNi_{0.8}Co_{0.15}Al_{0.05}O_2$, $LiNi_{0.5}Mn_{0.5}O_2$, $LiNi_{0.6}Mn_{0.4}O_2$, $LiNi_{0.7}Mn_{0.3}O_2$, $LiNi_{0.8}Mn_{0.2}O_2$, $LiNi_{0.5}Co_{0.5}O_2$, $LiNi_{0.6}Co_{0.4}O_2$, $LiNi_{0.7}Co_{0.3}O_2$, $LiNi_{0.8}Co_{0.2}O_2$, $LiNiO_2$, and combinations thereof.

In some embodiments, the cathode active material comprises or is a core-shell composite having a core and shell structure, wherein the core and the shell each independently comprise a lithium transition metal oxide selected from the group consisting of $Li_{1+x}Ni_aMn_bCoAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, $LiNi_{0.5}Mn_{1.5}O_4$, $LiNi_{0.4}Mn_{1.6}O_4$, and combinations thereof; wherein $0 \leq x \leq 0.2$, $0 < a \leq 1$, $0 \leq b < 1$, $0 \leq c < 1$, and $a+b+c \leq 1$. In certain embodiments, the cathode active material does not comprise a core and shell structure.

In certain embodiments, the anode active material is selected from the group consisting of graphite, natural graphite particulate, synthetic graphite particulate, hard carbon, mesophase carbon, Sn particulate, $Li_4Ti_5O_{12}$ particulate, Si particulate, Si—C composite particulate, and combinations thereof.

In some embodiments, the anode active material comprises or is a core-shell composite having a core and shell structure, wherein each of the core and the shell is independently selected from the group consisting of graphite, natural graphite particulate, synthetic graphite particulate, hard carbon, mesophase carbon, Sn particulate, $Li_4Ti_5O_{12}$ particulate, Si particulate, Si—C composite particulate, and combinations thereof. In certain embodiments, the anode active material does not comprise a core and shell structure.

In certain embodiments, the cathode active material and the anode active material are a major component in the cathode electrode layer and the anode electrode layer respectively. In some embodiments, the amount of each of the cathode active material and the anode active material is independently from about 70% to about 99%, from about 70% to about 95%, from about 70% to about 90%, from about 70% to about 85%, from about 70% to about 80%, from about 80% to about 99%, from about 80% to about 95%, from about 80% to about 90%, from about 85% to about 95%, from about 85% to about 90%, or from about 90% to about 99% by weight, based on the total weight of the cathode electrode layer or the anode electrode layer. In certain embodiments, the amount of each of the cathode active material and the anode active material is independently less than about 99%, less than about 95%, less than about 90%, less than about 85%, less than about 80%, or less than about 75% by weight, based on the total weight of the cathode electrode layer or the anode electrode layer. In some embodiments, the amount of each of the cathode active material and the anode active material is independently more than about 70%, more than about 75%, more than about 80%, more than about 85%, more than about 90%, or more than about 95% by weight, based on the total weight of the cathode electrode layer or the anode electrode layer.

In certain embodiments, the conductive agents of the at least one cathode and the at least one anode is independently selected from the group consisting of carbon, carbon black, acetylene black, Super P, graphene, graphene nanoplatelets, carbon fibres, carbon nano-fibers, graphitized carbon flake, carbon tubes, carbon nanotubes, activated carbon, mesoporous carbon, and combinations thereof.

In some embodiments, the amounts of each of the conductive agents in the cathode electrode layer and the anode electrode layer is independently from about 1% to about 20%, from about 1% to about 15%, from about 1% to about 10%, from about 1% to about 8%, from about 1% to about 6%, from about 1% to about 5%, from about 1% to about 4%, from about 1% to about 3%, from about 2% to about 10%, from about 2% to about 8%, or from about 3% to about 10% by weight, based on the total weight of the cathode electrode layer or the anode electrode layer. In certain embodiments, the amounts of each of the conductive agents in the cathode electrode layer and the anode electrode layer is independently less than about 20%, less than about 15%, less than about 10%, less than about 5%, less than about 4%, less than about 3%, less than about 2%, or less than about 1% by weight, based on the total weight of the cathode electrode layer or the anode electrode layer. In some embodiments, the amounts of each of the conductive agents in the cathode electrode layer and the anode electrode layer is independently more than about 1%, more than about 2%, more than about 3%, more than about 4%, more than about 5%, or more than about 10% by weight, based on the total weight of the cathode electrode layer or the anode electrode layer.

In certain embodiments, each of the binder material in the cathode electrode layer and anode electrode layer is independently selected from the group consisting of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, a salt of alginic acid, LA132, LA133, and combinations thereof. In some embodiments, the salt of alginic acid comprises a cation selected from Na, Li, K, Ca, $NH_4$, Mg, Al, or a combination thereof.

In certain embodiments, the amount of each of the binder material in the cathode electrode layer and the anode electrode layer is independently from about 1% to about 20%, from about 1% to about 15%, from about 1% to about 10%, from about 1% to about 8%, from about 1% to about 6%, from about 1% to about 5%, from about 1% to about 4%, from about 2% to about 10%, from about 2% to about 8%, or from about 3% to about 10% by weight, based on the total weight of the cathode electrode layer or the anode electrode layer. In some embodiments, the amount of each of the binder material in the cathode electrode layer and the anode electrode layer is independently less than about 20%, less than about 15%, less than about 10%, less than about 8%, less than about 6%, less than about 5%, less than about 4%, less than about 3%, less than about 2%, or less than about 1% by weight, based on the total weight of the cathode electrode layer or the anode electrode layer. In certain embodiments, the amount of each of the binder material in cathode electrode layer and the anode electrode layer is independently more than about 1%, more than about 2%, more than about 3%, more than about 4%, more than about 5%, more than about 6%, more than about 8%, or more than about 10% by weight, based on the total weight of the cathode electrode layer or the anode electrode layer.

In some embodiments, the thickness of the cathode electrode layer is from about 50 μm to about 150 μm, from about 50 μm to about 120 μm, from about 50 μm to about 100 μm, from about 50 μm to about 80 μm, from about 80 μm to about 150 μm, from about 80 μm to about 120 μm, or from about 100 μm to about 150 μm. In certain embodiments, the thickness of the cathode electrode layer is less than about 150 μm, less than about 120 μm, less than about 100 μm, or less than about 80 μm. In some embodiments, the thickness of the cathode electrode layer is greater than about 50 μm, greater than about 80 μm, greater than about 100 μm, or greater than about 120 μm.

In certain embodiments, the thickness of the cathode current collector is from about 10 μm to about 25 μm, from about 10 μm to about 22 μm, from about 10 μm to about 20 μm, from about 10 μm to about 18 μm, from about 10 μm to about 15 μm, from about 15 μm to about 25 μm, from about 15 μm to about 20 μm, or from about 18 μm to about 25 μm. In some embodiments, the thickness of the cathode current collector is less than about 25 μm, less than about 22 μm, less than about 20 μm, less than about 18 μm, or less than about 15 μm. In certain embodiments, the thickness of the cathode current collector is greater than about 10 μm, greater than about 15 μm, greater than about 18 μm, greater than about 20 μm, or greater than about 22 μm.

In some embodiments, the thickness of the at least one cathode is from about 60 μm to about 180 μm, from about 60 μm to about 150 μm, from about 60 μm to about 120 μm, from about 60 μm to about 100 μm, from about 90 μm to about 180 μm, from about 90 μm to about 150 μm, or from about 120 μm to about 180 μm. In certain embodiments, the thickness of the at least one cathode is less than about 180 μm, less than about 150 μm, less than about 120 μm, or less than about 90 μm. In some embodiments, the thickness of the at least one cathode is greater than about 60 μm, greater than about 100 μm, greater than about 120 μm, or greater than about 150 μm.

In certain embodiments, the thickness of the anode electrode layer is from about 40 μm to about 140 μm, from about 40 μm to about 100 μm, from about 40 μm to about 80 μm, from about 80 μm to about 140 μm, or from about 100 μm to about 140 μm. In some embodiments, the thickness of the anode electrode layer is less than about 140 μm, less than about 100 μm, or less than about 80 μm. In certain embodiments, the thickness of the anode electrode layer is greater than about 40 μm, greater than about 80 μm, or greater than about 100 μm.

In some embodiments, the thickness of the anode current collector is from about 6 μm to about 20 μm, from about 6 μm to about 18 μm, from about 6 μm to about 15 μm, from about 6 μm to about 12 μm, from about 10 μm to about 20 μm, from about 10 μm to about 15 μm, or from about 12 μm to about 20 μm. In certain embodiments, the thickness of the anode current collector is less than about 20 μm, less than about 18 μm, less than about 16 μm, less than about 14 μm, less than about 12 μm, or less than about 10 μm. In some embodiments, the thickness of the anode current collector is greater than about 6 μm, greater than about 8 μm, greater than about 10 μm, greater than about 12 μm, greater than about 14 μm, greater than about 16 μm, or greater than about 18 μm.

In certain embodiments, the thickness of the at least one anode is from about 45 μm to about 160 μm, from about 45 μm to about 120 μm, from about 45 μm to about 100 μm, from about 45 μm to about 80 μm, from about 80 μm to about 160 μm, or from about 100 μm to about 160 μm. In some embodiments, the thickness of the at least one anode is less than about 160 μm, less than about 120 μm, less than about 100 μm, or less than about 80 μm. In certain embodiments, the thickness of the at least one anode is greater than about 45 μm, greater than about 80 μm, greater than about 100 μm, or greater than about 120 μm.

The lithium-ion battery comprises the electrode assembly impregnated in an electrolyte. In some embodiments, the electrolyte is a non-aqueous organic solvent selected from a carbonate-based, ester-based, ether-based or other aprotic solvent. Some non-limiting examples of the carbonate-based solvent include dimethyl carbonate, diethyl carbonate, dipropyl carbonate, methylpropyl carbonate, ethylpropyl carbonate, ethyl methyl carbonate, ethylene carbonate, propylene carbonate, butylene carbonate, and combinations thereof. Some non-limiting examples of the ester-based solvent include methyl acetate, methyl propanoate, ethyl acetate, n-propyl acetate, dimethylacetate, methyl propionate, ethyl propionate, and combinations thereof. Some non-limiting examples of the ether-based solvent include dibutyl ether, tetraglyme, diglyme, dimethoxyethane, 2-methyltetrahydrofuran, tetrahydrofuran, and combinations thereof. Some non-limiting examples of the other aprotic solvent include methyl bromide, ethyl bromide, methyl formate, acetonitrile, dimethyl sulfoxide, dimethylformamide, N-methyl-2-pyrrolidone, and combinations thereof. The non-aqueous organic solvent may be used singularly or in a mixture. When the organic solvent is used in a mixture, its mixture ratio can be controlled in accordance with desirable performance of a battery.

In some embodiments, the electrolyte composition comprises an electrolyte and a lithium salt dissolved therein. The lithium salt is dissolved in the non-aqueous organic solvent and supplies lithium ions in a rechargeable lithium battery. The electrolyte may comprise at least one lithium salt selected from the group consisting of $LiPF_6$, $LiBF_4$, $LiSbF_6$, $LiAsF_6$, $LiClO_4$, $LiCl$, $LiI$, $LiB(C_2O_4)_2$, $LiSO_3CF_3$, $LiN(SO_2CF_3)_2$, $LiN(SO_2CF_2CF_3)_2$, $LiC_4F_9SO_3$, or combinations thereof. The lithium salt may be used in a concentration of about 0.1 M to about 2.0 M. More severe temperature conditions, for example −30° C., can be managed by the electrolyte composition due to freezing point depression caused by lithium salt in the electrolyte.

In certain embodiments, the electrolyte composition further comprises an additive. Some non-limiting examples of the additive include vinylene carbonate, diethylstilbestrol, butanesultone, dimethyl sulfide, and combinations thereof. In some embodiments, the total amount of the additives is from about 0.1% to about 10%, from about 0.1% to about 5%, or from about 0.1% to about 2% by weight or volume, based on the total weight or volume of the electrolyte.

The lithium-ion battery comprising the separator disclosed herein can prevent battery overcharge, overvoltage and overcurrent and thus the ignition and/or explosion of the battery. In some embodiments, ignition or explosion of the lithium-ion battery does not occur when the battery is charged at a voltage from about 3V to about 12V, from about 3V to about 10V, from about 5V to about 10V, from about 6V to about 10V, from about 7V to about 10V, from about 8V to about 10V, or from about 9V to about 10V. In certain embodiments, ignition or explosion of the lithium-ion battery does not occur when the battery is charged at a voltage greater than or equal to about 3V, greater than or equal to about 4V, greater than or equal to about 5V, greater than or equal to about 6V, greater than or equal to about 7V, greater than or equal to about 8V, greater than or equal to about 9V, or greater than or equal to about 10V.

In some embodiments, ignition or explosion of the lithium-ion battery does not occur when the battery is charged at a C-rate from about 1C to about 3C, from about 1C to about 2C, or from about 2C to about 3C. In certain embodiments, ignition or explosion of the lithium-ion battery does not occur when the battery is charged at a C-rate greater than or equal to about 1C, greater than or equal to about 2C, or greater than or equal to about 3C.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Example 1

A) Preparation of Cathode

A cathode slurry was prepared by dispersing 50 kg of cathode active material NMC333 (obtained from Shenzhen Tianjiao Technology Co. Ltd., China), 2.5 kg of carbon black (SuperP; obtained from Timcal Ltd, Bodio, Switzerland), and 15 kg of LA132 having a solid content of 15 wt. % (obtained from Chengdu Indigo Power Sources Co., Ltd., China) in 10 L of water to form a cathode slurry having a solid content of 70.6 wt. %. The cathode slurry was homogenized by a planetary stirring mixer (60 L mixer, Chienemei Industry Co. Ltd., China) for 3 hours operated at a stirring speed of 20 rpm and a dispersing speed of 1,500 rpm at room temperature to obtain a homogenized cathode slurry.

The homogenized cathode slurry prepared above was coated onto both sides of an aluminum foil having a thickness of 20 μm using a transfer coater with an area density of about 26 mg/cm$^2$ and dried.

B) Preparation of Anode

An anode slurry was prepared by dispersing 25 kg of hard carbon (HC; purity of 99.5%, obtained from Ruifute Technology Ltd., Shenzhen, Guangdong, China), 0.8 kg of carbon black and 7.0 kg of LA132 in 20 L of water to obtain an anode slurry having a solid content of 50.8 wt. %. The anode slurry was homogenized by a planetary stirring mixer (60 L mixer, obtained from Chienemei Industry Co. Ltd., China) for 4 hours operated at a planetary blade speed of 120 rpm and a dispersion blade speed of 1,200 rpm at room temperature to obtain a homogenized anode slurry.

The anode slurry was coated onto both sides of a copper foil having a thickness of 9 μm using a transfer coater with an area density of about 15 mg/cm$^2$ and dried.

C) Assembling of Pouch Cell

After drying, the cathode and anode were cut into individual cathode plates and anode plates having a width of 48 mm and 49 mm respectively. A separator containing a PET porous base material having a thickness of 10 μm and a surface density of 12 g/m$^2$ and a PVDF porous polymer layer formed thereon, having a thickness of 15 μm and a surface density of 20 g/m$^2$ was used. The separator had a porosity of 42%, Gurley value of 6 seconds/100 cm$^3$ and width of 53 mm. The PET porous base material had vertical channels extending through the thickness from one surface to the opposite surface. A separator was folded in a zigzag shape and stacked in a format that an anode plate and a cathode plate were alternately inserted to form a cell stack. The cathode and anode were positioned on the opposite sides of the separator. The stack was then packaged in a case made of an aluminum-plastic laminated film. The cathode and anode electrode plates were kept apart by the separator and the case was pre-formed.

A pouch cell was formed by filling an electrolyte into the case holding the packed electrodes in high-purity argon atmosphere with moisture and oxygen content less than 1 ppm. The electrolyte was a solution of LiPF$_6$ (1 M) in a mixture of ethylene carbonate (EC), ethyl methyl carbonate (EMC) and dimethyl carbonate (DMC) in a volume ratio of 1:1:1. After electrolyte filling, the pouch cell was vacuum sealed and then mechanically pressed using a punch tooling with standard square shape.

The components and parameter values used in the lithium-ion battery of Example 1 are shown in Table 1.

D) Electrochemical Performance of Ouch Cell

I) Nominal Capacity

The cell was tested galvanostatically at a current density of C/2 at 25° C. on a battery tester (BTS-5V20A, obtained from Neware Electronics Co. Ltd, China) between 3.0 V and 4.2 V. The nominal capacity was about 3,300 mAh.

II) Cyclability Performance

The cyclability performance of the pouch cell was tested by charging and discharging at a constant current rate of 1C between 3.0 V and 4.2 V. The capacity retention after 500 cycles was about 81% of the initial value. The electrochemical performance of the pouch cell of Example 1 is shown in Table 2.

E) Overcharging Test of Pouch Cell

The pouch cell was fully (100%) discharged at a rate of 0.2 C between 3.0 V and 4.2 V at room temperature, and then charged by a DC power at 10V and a rate of 3C (10 A) at room temperature for 1 hour or until the cell voltage stopped increasing. This procedure was repeated by overcharging another 2 pouch cells to evaluate the safety performance.

The pouch cell was charged for 1 hour by a DC power at 10V and a rate of 3C (10 A) at room temperature. It was observed that the pouch cell was fully charged after about 20 minutes. After charging for 30 minutes, the cell voltage stopped increasing and the temperature of the cell decreased. No ignition occurred for all the pouch cells after charging for 1 hour. The overcharging test result of Example 1 is shown in Table 2.

Example 2

A pouch cell was prepared by the method of Example 1 except that the thickness of the porous polymer layer was 30 μm instead of 15 μm and the surface density of the porous polymer layer was 9 g/m$^2$ instead of 20 g/m$^2$.

Example 3

A pouch cell was prepared by the method of Example 1 except that the thickness of the porous polymer layer was 10 μm instead of 15 μm and the surface density of the porous polymer layer was 30 g/m$^2$ instead of 20 g/m$^2$.

Example 4

Figure 3:
FIG. 3 illustrates an image of the battery of Example 4 after overcharge test.

A pouch cell was prepared by the method of Example 1 except that a PVDF porous polymer layer with Al$_2$O$_3$ particles uniformly distributed throughout said layer was used instead of a pure PVDF porous polymer layer. The porous polymer layer contained 90 wt. % of PVDF and 10 wt. % of Al$_2$O$_3$ particles. One of the pouch cells was then disassembled to obtain the cathodes, anodes and the separator sheet. FIG. 1 shows the cathode surface covered with a PVDF film after disassembling. FIG. 3 shows the battery cell after overcharging at high voltage for 1 hour. Overcharging of the battery cell did not lead to fire or explosion.

Example 5

A pouch cell was prepared by the method of Example 4 except that the thickness of the porous polymer layer was 30 μm instead of 15 μm and the surface density of the porous polymer layer was 9 g/m$^2$ instead of 20 g/m$^2$.

Example 6

A pouch cell was prepared by the method of Example 4 except that the thickness of the porous polymer layer was 10

µm instead of 15 µm and the surface density of the porous polymer layer was 30 g/m² instead of 20 g/m².

Example 7

A pouch cell was prepared by the method of Example 4 except that the surface density of the porous polymer layer was 11 g/m² instead of 20 g/m².

Comparative Example 1

A pouch cell was prepared by the method of Example 1 except that a trilayer polyethylene/$Al_2O_3$/PVDF separator was used instead of a coated PET separator. The trilayer separator contained a porous polyethylene layer having a thickness of 20 µm and porosity of 40% as the porous base material, an $Al_2O_3$ layer having a thickness of 3 µm coated on the surface of the porous polyethylene layer and a porous PVDF layer having a thickness of 1 µm and a surface density of 2 g/m² as the porous polymer layer coated on the surface of the $Al_2O_3$ layer.

Comparative Example 2

A pouch cell was prepared by the method of Comparative Example 1 except that a multilayer separator was used instead of the trilayer polyethylene/$Al_2O_3$/PVDF separator. The multilayer separator contained a porous PP/PE/PP trilayer having a thickness of 20 µm and porosity of 30% as the porous base material, an $Al_2O_3$ layer having a thickness of 3 µm coated on the surface of the PP/PE/PP trilayer and a porous PVDF layer as a porous polymer layer coated on the surface of the $Al_2O_3$ layer.

Comparative Example 3

Figure 4:
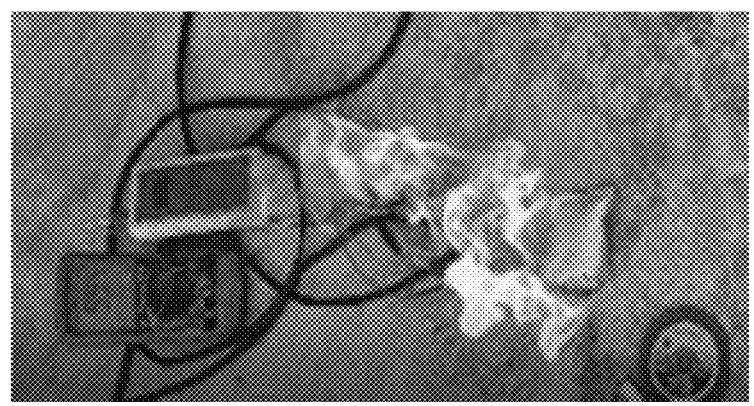
FIG. 4 illustrates an image of the battery of Comparative 3 after overcharge test.

A pouch cell was prepared by the method of Example 4 except that the cell stacked was assembled in a way that the porous polymer layer of the separator was adjacent to the anode instead of the cathode. FIG. 2 shows an anode surface which was not fully covered by a PVDF film due to formation of cracks and holes on the film. FIG. 4 shows the battery cell after charging at high voltage for 30 minutes. The battery cell overheated and burst into flame after 30 minutes.

Comparative Example 4

A pouch cell was prepared by the method of Example 4 except that the thickness of the porous polymer layer was 8 µm instead of 15 µm.

Comparative Example 5

A pouch cell was prepared by the method of Example 4 except that the thickness of the porous polymer layer was 35 µm instead of 15 µm and the thickness of the porous base material was 5 µm instead of 10 µm.

Comparative Example 6

A pouch cell was prepared by the method of Example 4 except that the surface density of the porous polymer layer was 7.5 g/m² instead of 20 g/m².

Comparative Example 7

A pouch cell was prepared by the method of Example 4 except that the surface density of the porous polymer layer was 35 g/m² instead of 20 g/m².

Comparative Example 8

A pouch cell was prepared by the method of Example 4 except that the thickness of the porous polymer layer was 8 µm instead of 15 µm and the surface density of the porous polymer layer was 35 g/m² instead of 20 g/m².

Comparative Example 9

A pouch cell was prepared by the method of Example 4 except that the thickness of the porous polymer layer was 35 µm instead of 15 µm and the surface density of the porous polymer layer was 5 g/m² instead of 20 g/m².

Comparative Example 10

A pouch cell was prepared by the method of Example 1 except that a separator having a non-woven PET porous base material coated with an $Al_2O_3$ layer having a thickness of 4 µm coated thereon was used instead of a separator coated with a PVDF porous polymer layer and the thickness of the porous base material is 20 µm instead of 10 µm.

Comparative Example 11

A pouch cell was prepared by the method of Comparative Example 10 except that the thickness of the PET porous base material was 12 µm instead of 20 µm and the thickness of the $Al_2O_3$ layer was 8 µm instead of 4 µm.

Comparative Example 12

A pouch cell was prepared by the method of Example 4 except that the width of the cathode was 53 mm instead of 48 mm.

Electrochemical Performance of Pouch Cells of Examples 2-7 and Comparative Examples 1-12

The electrochemical performance of the pouch cells of Examples 2-7 and Comparative Examples 1-12 were tested by the method described in Example 1 and the test results are shown in Table 2.

Overcharging Test of Pouch Cells of Examples 2-7 and Comparative Examples 1-12

The overcharging tests of pouch cells of Examples 2-7 and Comparative Examples 1-12 were performed by the method described in Example 1 and the test results are shown in Table 2.

To pass our overcharge test, the cell cannot explode or ignite. The cells of Examples 1-7 showed excellent safety performance. Examples 1-7 passed the overcharge test in which none of the cells exploded or ignited, whereas Comparative Examples 1-4, 6 and 8-12 did not pass the overcharge test. Therefore, the separators of Comparative Examples 1-4, 6 and 8-12 provided inadequate protection under overcharging conditions. Although batteries of Comparative Examples 5 and 7 passed the overcharge test, they exhibited poorer electrochemical performance due to increased thickness of the separator and increased surface density of the porous polymer layer respectively, which increased the internal resistance and impaired energy density.

TABLE 1

| | | Separator | | | | | | | |
|---|---|---|---|---|---|---|---|---|---|
| | | Porous base material | | | Coating | | | | Width ratio |
| | | | | | | Porous polymer layer | | | |
| | Arrangement of separator coating | Polymer | Thickness ($\mu m$) | Coating layer | Polymer (wt. %) | Inorganic material (wt. %) | Surface density ($g/m^2$) | Thickness ($\mu m$) | of separator to cathode |
| Example 1 | Adjacent to cathode | PET | 10 | PVDF | 100 | 0 | 20 | 15 | 1.1 |
| Example 2 | Adjacent to cathode | PET | 10 | PVDF | 100 | 0 | 9 | 30 | 1.1 |
| Example 3 | Adjacent to cathode | PET | 10 | PVDF | 100 | 0 | 30 | 10 | 1.1 |
| Example 4 | Adjacent to cathode | PET | 10 | PVDF with $Al_2O_3$ | 90 | 10 | 20 | 15 | 1.1 |
| Example 5 | Adjacent to cathode | PET | 10 | PVDF with $Al_2O_3$ | 90 | 10 | 9 | 30 | 1.1 |
| Example 6 | Adjacent to cathode | PET | 10 | PVDF with $Al_2O_3$ | 90 | 10 | 30 | 10 | 1.1 |
| Example 7 | Adjacent to cathode | PET | 10 | PVDF with $Al_2O_3$ | 90 | 10 | 11 | 15 | 1.1 |
| Comparative Example 1[1] | Adjacent to cathode | PE | 20 | $Al_2O_3$/PVDF | 100 | 0 | 2 | 1 | 1.1 |
| Comparative Example 2[1] | Adjacent to cathode | PP/PE/PP | 20 | $Al_2O_3$/PVDF | 100 | 0 | 2 | 1 | 1.1 |
| Comparative Example 3 | Adjacent to anode | PET | 10 | PVDF with $Al_2O_3$ | 90 | 10 | 20 | 15 | 1.1 |
| Comparative Example 4 | Adjacent to cathode | PET | 10 | PVDF with $Al_2O_3$ | 90 | 10 | 20 | 8 | 1.1 |
| Comparative Example 5 | Adjacent to cathode | PET | 5 | PVDF with $Al_2O_3$ | 90 | 10 | 20 | 35 | 1.1 |
| Comparative Example 6 | Adjacent to cathode | PET | 10 | PVDF with $Al_2O_3$ | 90 | 10 | 7.5 | 15 | 1.1 |
| Comparative Example 7 | Adjacent to cathode | PET | 10 | PVDF with $Al_2O_3$ | 90 | 10 | 35 | 15 | 1.1 |
| Comparative Example 8 | Adjacent to cathode | PET | 10 | PVDF with $Al_2O_3$ | 90 | 10 | 35 | 8 | 1.1 |
| Comparative Example 9 | Adjacent to cathode | PET | 10 | PVDF with $Al_2O_3$ | 90 | 10 | 5 | 35 | 1.1 |
| Comparative Example 10[2] | Adjacent to cathode | PET | 20 | $Al_2O_3$ | / | / | / | / | 1.1 |
| Comparative Example 11[3] | Adjacent to cathode | PET | 12 | $Al_2O_3$ | / | / | / | / | 1.1 |
| Comparative Example 12 | Adjacent to cathode | PET | 10 | PVDF with $Al_2O_3$ | 90 | 10 | 20 | 15 | 1 |

[1]The $Al_2O_3$ coating layer having a thickness of 3 $\mu m$ was interposed between the porous base material and porous polymer layer
[2]The $Al_2O_3$ coating layer had a thickness of 4 $\mu m$.
[3]The $Al_2O_3$ coating layer had a thickness of 8 $\mu m$.

TABLE 2

| | No. of ignited cell/total no. of cells | Safety test | Capacity retention (%) after 500 cycles |
|---|---|---|---|
| Example 1 | 0/3 | Pass | 81 |
| Example 2 | 0/3 | Pass | 82 |
| Example 3 | 0/3 | Pass | 84 |
| Example 4 | 0/3 | Pass | 82 |
| Example 5 | 0/3 | Pass | 81 |
| Example 6 | 0/3 | Pass | 80 |
| Example 7 | 0/3 | Pass | 81 |
| Comparative Example 1 | 3/3 | Fail | 79 |
| Comparative Example 2 | 3/3 | Fail | 78 |
| Comparative Example 3 | 1/3 | Fail | 80 |
| Comparative Example 4 | 1/3 | Fail | 80 |
| Comparative Example 5 | 0/3 | Pass | 75 |
| Comparative Example 6 | 1/3 | Fail | 82 |
| Comparative Example 7 | 0/3 | Pass | 75 |
| Comparative Example 8 | 1/3 | Fail | 81 |
| Comparative Example 9 | 2/3 | Fail | 79 |
| Comparative Example 10 | 2/3 | Fail | 78 |
| Comparative Example 11 | 2/3 | Fail | 79 |
| Comparative Example 12 | 3/3 | Fail | 70 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention

What is claimed is:
1. A lithium-ion battery comprising an electrode assembly, wherein the electrode assembly comprises at least one cathode, at least one anode, and a separator interposed between the at least one cathode and the at least one anode;

wherein the separator consists of a porous base material and a porous polymer layer coated on only one surface of the porous base material and adjacent to the at least one cathode;

wherein the thickness of the porous polymer layer is from about 10 µm to about 30 µm;

wherein the surface density of the porous polymer layer is from about 9 g/m$^2$ to about 30 g/m$^2$; and wherein the melting point of the porous base material is at least about 30° C. higher than the melting point of the porous polymer layer.

2. The lithium-ion battery of claim 1, wherein the melting point of the porous base material is at least about 60° C. higher than the melting point of the porous polymer layer.

3. The lithium-ion battery of claim 1, wherein the melting point of the porous base material is about 200° C. or above.

4. The lithium-ion battery of claim 1, wherein the porous base material is a membrane, a non-woven fabric or a woven fabric.

5. The lithium-ion battery of claim 1, wherein the thickness of the porous base material is from about 5 µm to about 25 µm.

6. The lithium-ion battery of claim 1, wherein the porous base material is a polymer selected from the group consisting of polyethylene terephthalate, polybutylene terephthalate, polyethylene naphthalene, polybutylene naphthalate, polyacetal, polyamide, polycarbonate, polyimide, polyetherether ketone, polysulfones, polyphenylene oxide, polyphenylene sulfide, polyacrylonitrile, polyvinylidene fluoride, poly(vinylidene fluoride)-hexafluoropropene, polyvinyl pyrrolidone, and combinations thereof.

7. The lithium-ion battery of claim 1, wherein the thickness of the porous polymer layer is from about 13 µm to about 25 µm.

8. The lithium-ion battery of claim 1, wherein the surface density of the porous polymer layer is from about 11 g/m$^2$ to about 25 g/m$^2$.

9. The lithium-ion battery of claim 1, wherein the porous polymer layer comprises a polymer selected from the group consisting of polyvinylidene fluoride, poly(vinylidene fluoride)-hexafluoropropene, polyacrylonitrile, polyvinyl chloride, polystyrene, polyimide, polyamide, polyacetal, polycarbonate, polyetherether ketone, polysulfone, polyphenylene oxide, polyphenylene sulphide, polyvinylpyrrolidone, polyethylene terephthalate, polybutylene terephthalate, polyethylene naphthalene, polybutylene naphthalate, polymethyl methacrylate, polymethylene oxide, polytetrafluoroethylene, polyvinyl fluoride, polyethylene, polypropylene, polybutylene, polypentene, and combinations thereof.

10. The lithium-ion battery of claim 9, wherein the porous polymer layer further comprises an inorganic material selected from the group consisting of $Al_2O_3$, $SiO_2$, $TiO_2$, $ZrO_2$, $Mg(OH)_2$, MgO, $SnO_2$, $CaCO_3$, $BaSO_4$, TiN, AlN, $Na_2O \cdot mTiO_2$, $K_2O \cdot nTiO_2$, $BaO_x$, $MTiO_3$, and combinations thereof, wherein m is 3 or 6, n is 1, 2, 4, 6, or 8, x is 1 or 2, and M is Ba, Sr, or Ca.

11. The lithium-ion battery of claim 10, wherein the amount of the polymer in the porous polymer layer is from about 70% to about 100% by weight, based on the total weight of the porous polymer layer.

12. The lithium-ion battery of claim 10, wherein the amount of the inorganic material is from about 0.01% to about 30% by weight, based on the total weight of the porous polymer layer.

13. The lithium-ion battery of claim 10, wherein the diameter of the inorganic material is from about 1 nm to about 1 µm, or from about 1 µm to about 5 µm.

14. The lithium-ion battery of claim 1, wherein the thickness of the separator is from about 15 µm to about 40 µm.

15. The lithium-ion battery of claim 1, wherein the porosity of the separator is from about 30% to about 55%.

16. The lithium-ion battery of claim 1, wherein the Gurley value of the separator is from about 5 seconds/100 cm$^3$ to about 200 seconds/100 cm$^3$.

17. The lithium-ion battery of claim 1, wherein the separator is free of a dispersant, surfactant, plasticizer, or combinations thereof.

18. The lithium-ion battery of claim 1, wherein the electrode assembly is constructed as a Z-folded stack of the at least one anode, at least one cathode and the separator.

19. The lithium-ion battery of claim 1, wherein the ratio of the width of the separator to the width of the at least one cathode is greater than about 1.

* * * * *